United States Patent
Naito et al.

(10) Patent No.: US 6,480,658 B1
(45) Date of Patent: Nov. 12, 2002

(54) OPTICAL FIBER TRANSMISSION LINE FOR WAVELENGTH DIVISION MULTIPLEXING TRANSMISSION SYSTEM

(75) Inventors: Takao Naito, Kawasaki (JP); Masuo Suyama, Kawasaki (JP); José Chesnoy, Paris (FR); Olivier Gautheron, Voisin le Bretonneux (FR)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/673,323

(22) PCT Filed: Feb. 8, 1999

(86) PCT No.: PCT/EP99/01270

§ 371 (c)(1), (2), (4) Date: Oct. 13, 2000

(87) PCT Pub. No.: WO00/49742

PCT Pub. Date: Aug. 24, 2000

(51) Int. Cl.[7] .............................. G02B 6/02; H04J 14/00
(52) U.S. Cl. ...................... 385/123; 385/122; 385/24; 359/115
(58) Field of Search ................................ 385/122, 123, 385/31, 24; 359/115, 124

(56) References Cited

U.S. PATENT DOCUMENTS

| | | | | |
|---|---|---|---|---|
| 4,261,639 A | * | 4/1981 | Kogelink et al. | ......... 350/96.15 |
| 5,191,631 A | | 3/1993 | Rosenburg | .................. 385/123 |
| 5,798,853 A | * | 8/1998 | Watanabe | .................... 359/160 |
| 5,960,146 A | * | 9/1999 | Okuno et al. | ................ 359/332 |
| 6,324,317 B1 | * | 11/2001 | Tanaka et al. | ............... 359/159 |

FOREIGN PATENT DOCUMENTS

| | | | |
|---|---|---|---|
| EP | 0 790 510 | 8/1997 | ............. 385/123 X |
| EP | 0 877 496 | 11/1998 | ............. 385/123 X |

OTHER PUBLICATIONS

Zou et al., "Limitations in 10 Bb/s WDM Optical–Fiber Transmission When Using a Variety of Fiber Types to Manage Dispersion and Nonlinearities", Journal of Lightwave Technology, vol. 14, No. 6 Jun. 1996.

Nuyts et al., "Performance Improvement of 10 Gb/s Standard Fiber Transmission Systems by Using the SPM Effect in the Dispersion Compensating Fiber", IEEE Photonics Technology Letters, vol. 8, No. 10, Oct. 1996.

\* cited by examiner

*Primary Examiner*—Brian Healy
(74) *Attorney, Agent, or Firm*—Staas & Halsey LLP

(57) ABSTRACT

An optical transmission system for transmitting an optical signal through an optical fiber transmission line includes a first optical fiber transmitting the optical signal and having a first zero-dispersion wavelength shorter than a wavelength of the optical signal, and a second optical fiber transmitting the optical signal from the first optical fiber and having a second zero-dispersion wavelength longer than the wavelength of the optical signal. A first nonlinear effective cross-sectional area of the first optical fiber is larger than a second nonlinear effective cross-sectional area of the second optical fiber.

5 Claims, 12 Drawing Sheets

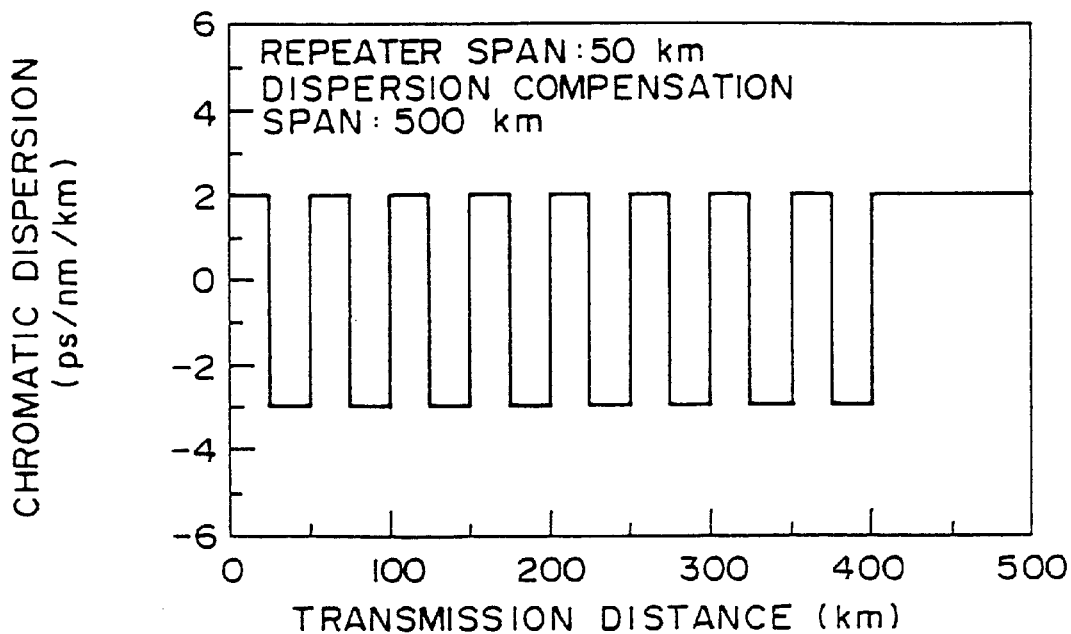
F I G. 5
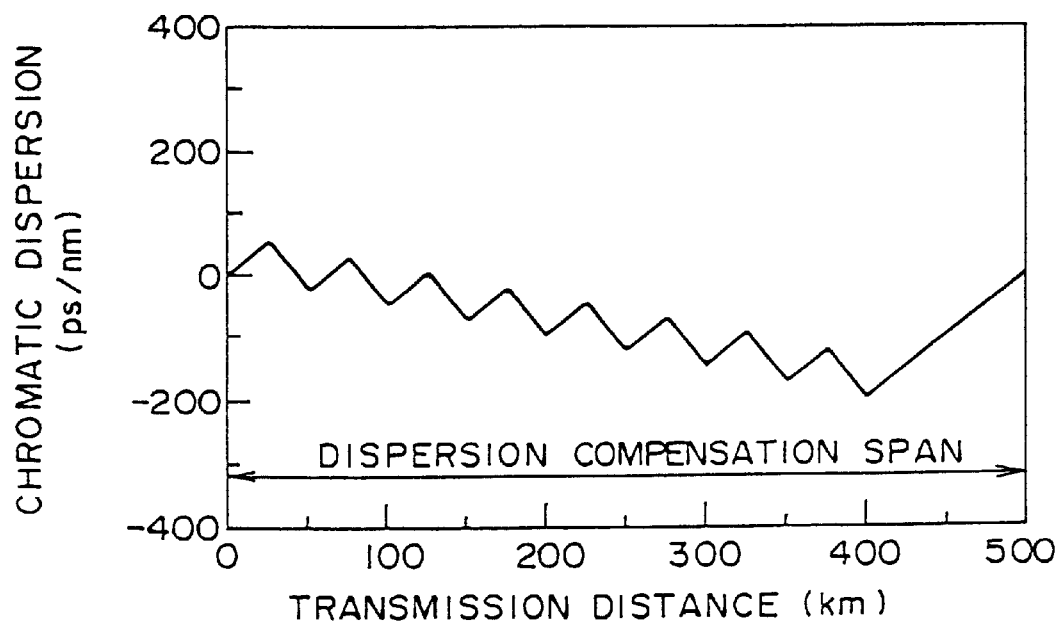
F I G. 6

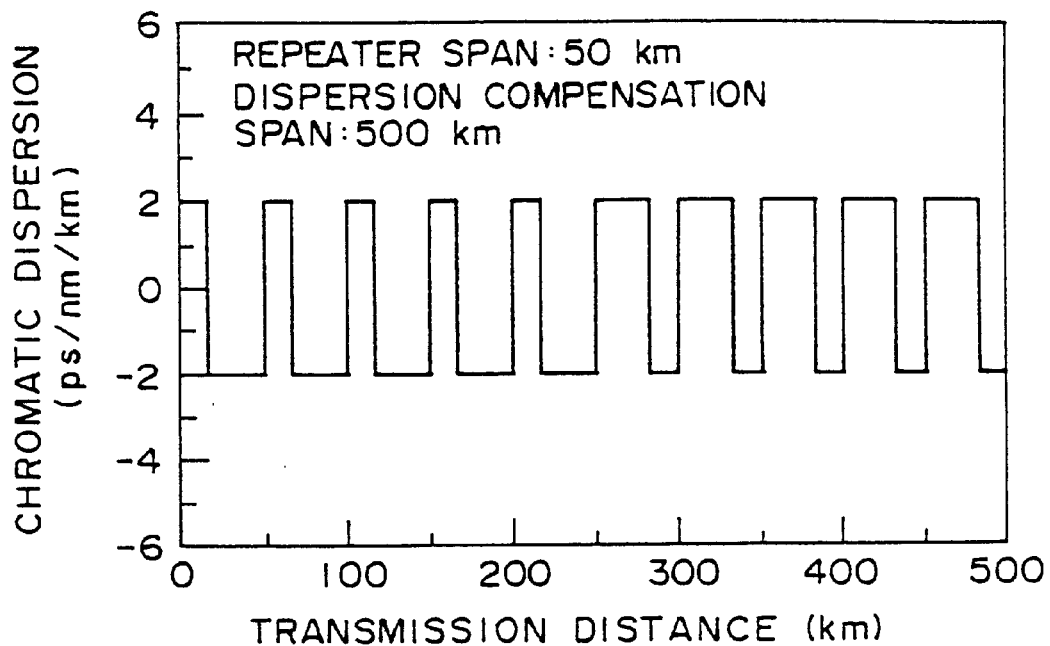
F I G. 7
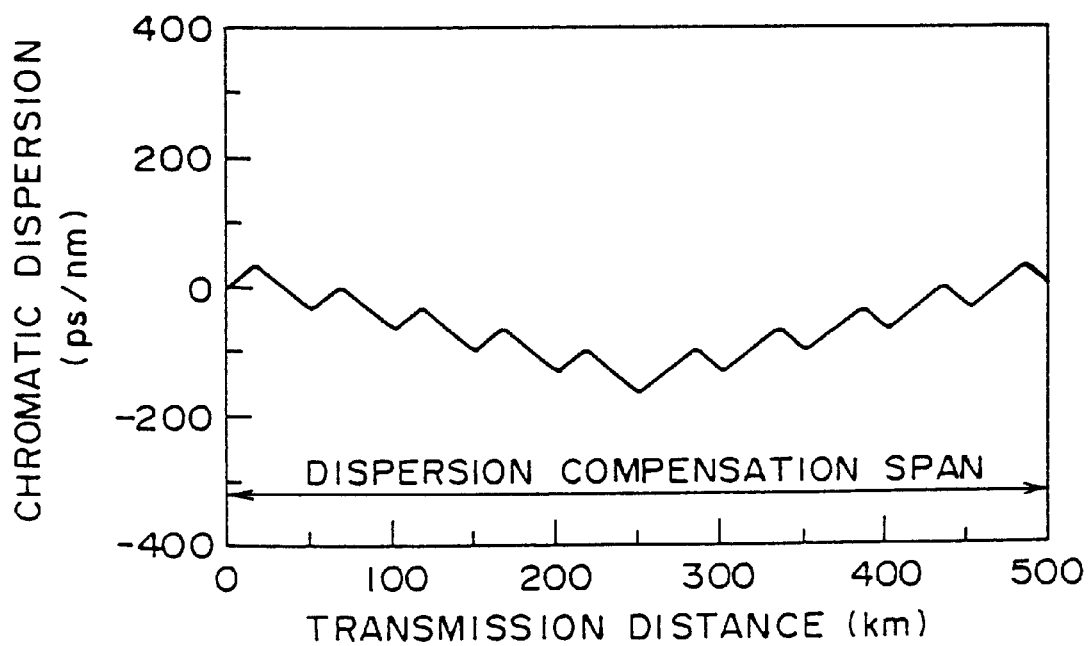
F I G. 8

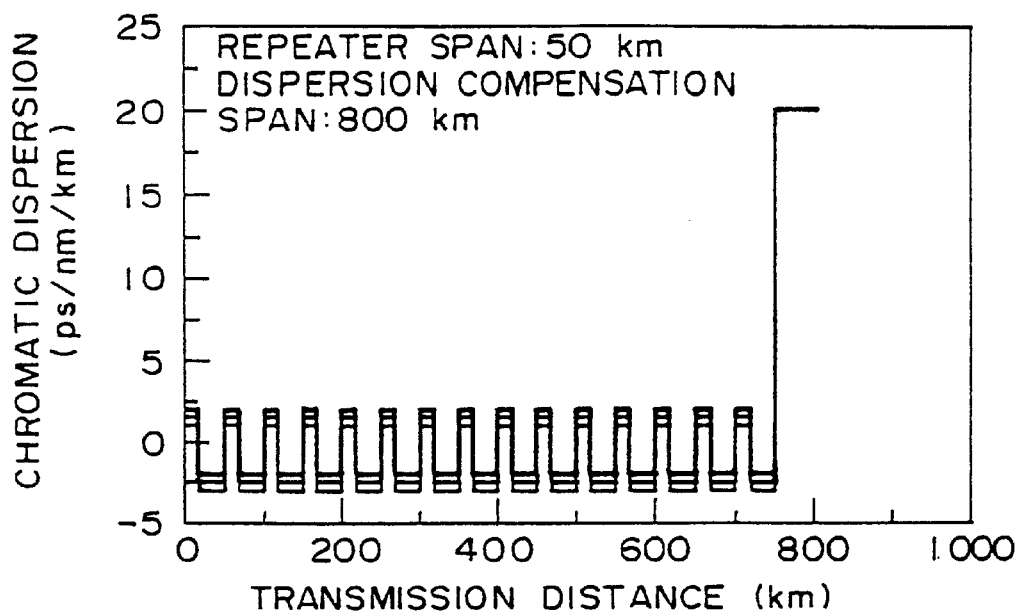
F I G. 11
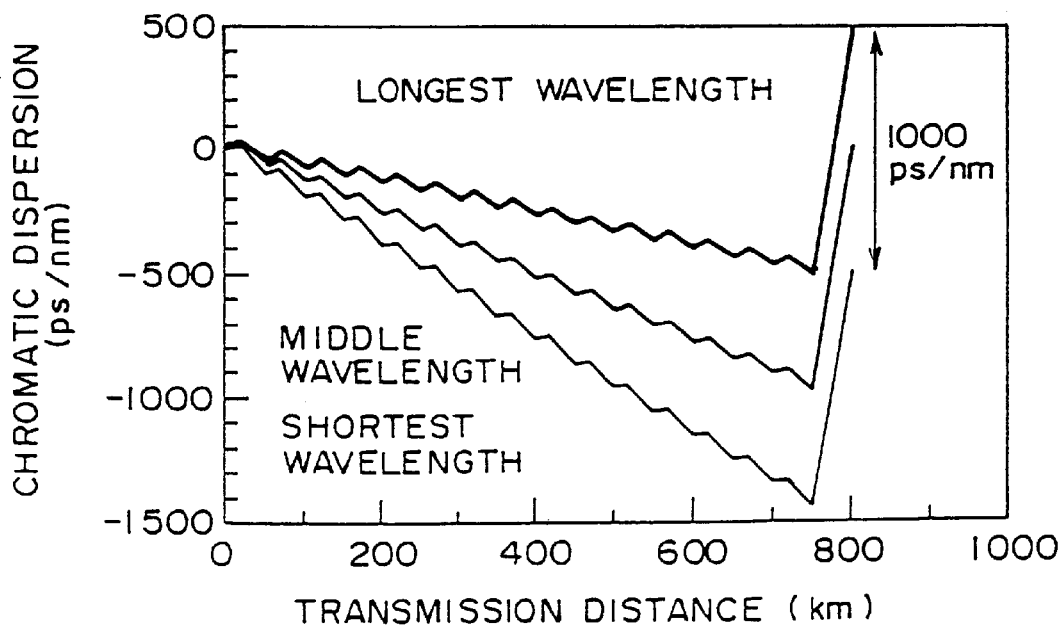
F I G. 12

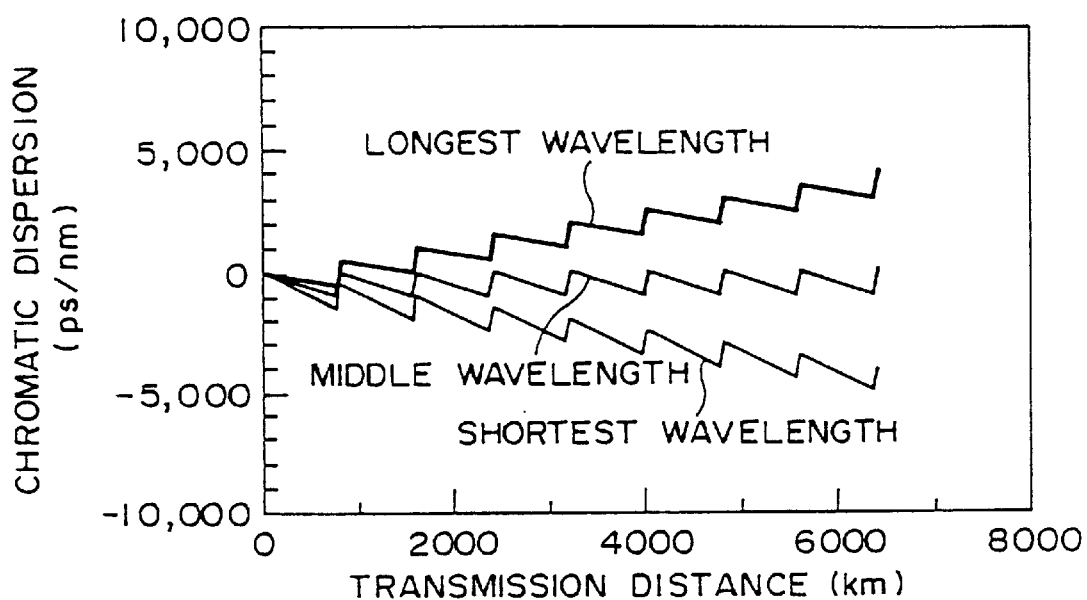
F I G. 13
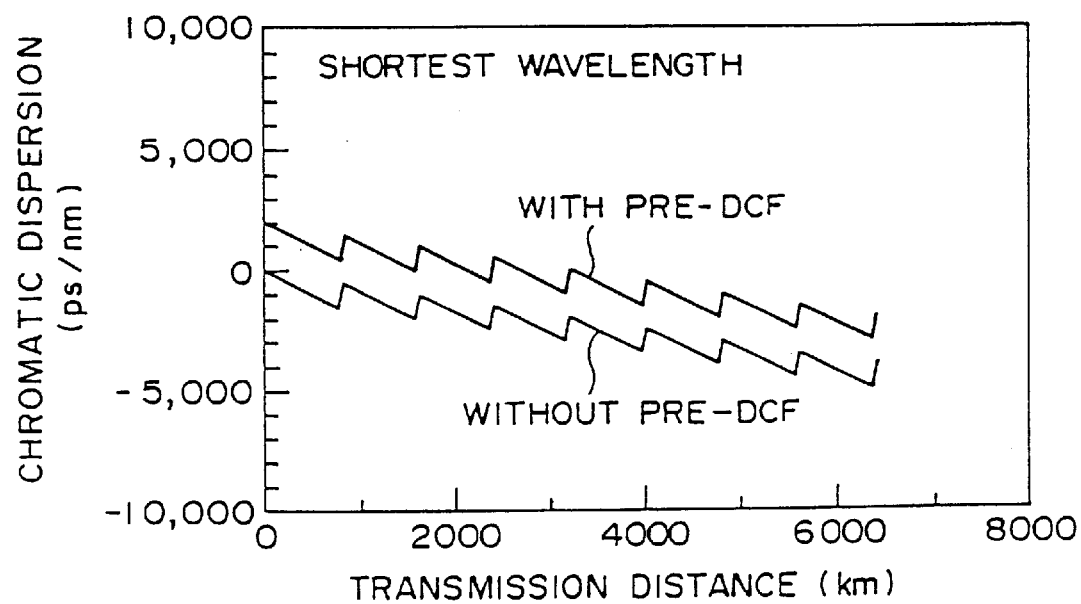
F I G. 14

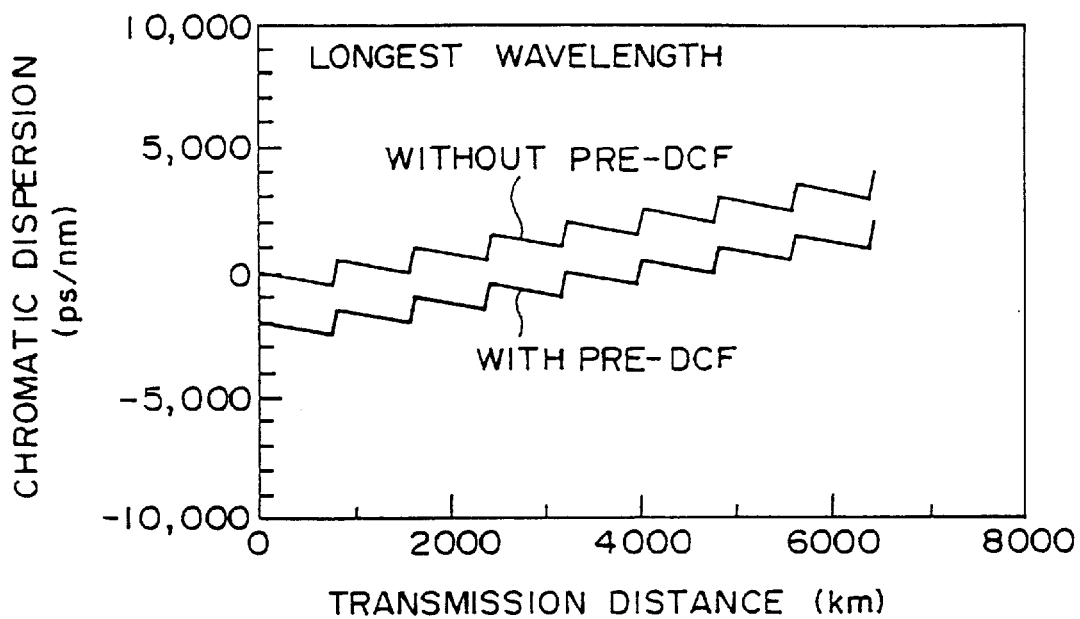
F I G. 15
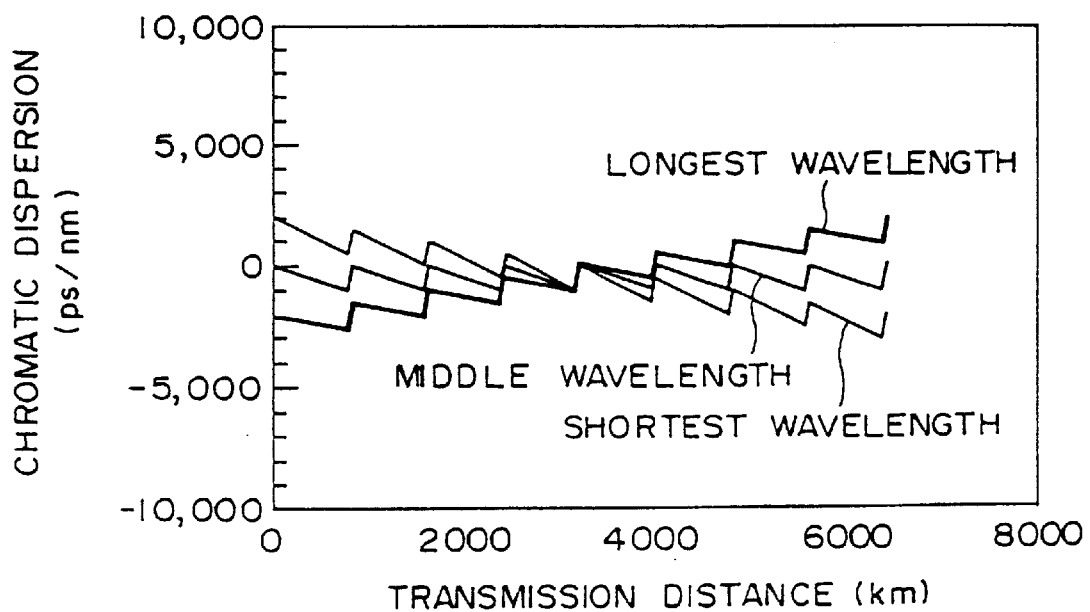
F I G. 16

OPTICAL FIBER TRANSMISSION LINE FOR WAVELENGTH DIVISION MULTIPLEXING TRANSMISSION SYSTEM

BACKGROUND OF INVENTION

In a long-distance optical transmission system, an optical repeater called a 3R optical repeater, which converts an optical signal into an electric signal for retiming, reshaping and regenerating the optical signal, has been used. At present, however, an optical fiber amplifier has been put into practical use to a large extent and R & D effort in this field is focused on the optical amplifying and repeating system using the optical amplifier as a linear repeater. By replacing the conventional 3R optical repeater with an optical amplifying repeater, a number of elements in the repeater can be reduced conspicuously, reliability of the system can be improved, and remarkable reduction of cost is realized.

Moreover, in order to realize a large capacity optical transmission system, attention is paid to a wavelength division multiplexing (WDM) optical transmission system in which two or more optical signals having different wavelengths are multiplexed onto a single optical fiber transmission line.

In a WDM optical amplifying and repeating transmission system in which the WDM optical transmission system and optical amplifying repeating transmission system are combined, the two or more optical signals having different wavelengths can be amplified at a time by optical amplifiers and thereby a large-capacity and long-distance transmission can be realized with a simplified and economical configuration.

In the wavelength division multiplexing repeating transmission system, management of the chromatic dispersion on the optical fiber transmission line is employed to reduce deterioration of transmission characteristics due to a nonlinear effect caused in the optical fiber transmission line (i.e., a single-mode optical fiber). FIGS. 17(a) and 17(b) show an example of chromatic dispersion in an experimental transmission system reported, for example, in an article of N.S. Bergano et al., "Wavelength division multiplexing in long-haul transmission system", IEEE Journal of Lightwave Technology, vol. 14, no. 6, pp. 1299–1308, 1996. In this experiment, a dispersion-shifted fiber (DSF) having a zero-dispersion wavelength $\lambda 0$ of 1585 nm in the length of about 900 km and the single mode fiber (SMF) having a zero-dispersion wavelength $\lambda 0$ of 1310 nm in the length of about 100 km are used in combination. The average zero-dispersion wavelength of the DSF in the length of about 900 km and the SMF in the length of about 100 km is about 1558 nm. Wavelength $\lambda 1$ of an optical signal ranges from 1556 nm to 1560 nm. The chromatic dispersion of the DSF is about −2 ps/nm, group velocities of the optical signals and spontaneous emission generated by optical amplifiers are different, and group velocities among optical signals are different. Thus, the period in which the nonlinear effect mutually affects these optical signals and the spontaneous emission can be shortened. Additionally, deterioration of the transmission characteristics due to the four-wave-mixing (FWM) and cross phase modulation (XPM) can be reduced.

In FIGS. 17(a) and 17(b), the DSF occupies about 90% of the optical fiber transmission line and is called a transmission fiber. An optical fiber for compensating for the chromatic dispersion of such a transmission fiber is called a dispersion compensation fiber.

FIG. 18 shows a proposed method to manage the chromatic dispersion of an optical fiber transmission line. In an example of the chromatic dispersion reported in an article of Y. Hayashi et al., "Verification of four-wave mixing suppression in WDM transmission experiments on the FSA commercial system with dispersion-managed optical fiber cable", OFC '96 TuI7, pp. 49–50, 1996, wherein chromatic dispersion administration is introduced to make zero the chromatic dispersion accumulated in each repeating span.

Therefore, self phase modulation (SPM) in addition to the chromatic dispersion is a major cause of limitation on the transmission characteristics.

Important requirements for an optical fiber transmission line used in the wavelength division multiplexing transmission system are listed below.

(1) Low transmission loss
(2) Large nonlinear effective cross-sectional area
(3) Nomatching between a wavelength of an optical signal and a zero-dispersion wavelength
(4) Average chromatic dispersion in a direction of transmission distance is negative
(5) Chromatic dispersion compensation interval is about 10 times the repeating interval In order to realize further large-capacity and long-haul transmission, focused should be placed on reducing the nonlinear effect of the optical fiber transmission line in the wavelength division multiplexing optical amplifying and repeating transmission system.

In order to attain such an object, an optical fiber having a nonlinear effective cross-sectional area (large effective area fiber, LEAF) is used in the following articles.

1) Y. Liu et al., "Single-mode dispersion-shifted fibers with large effective area for amplified system" IOOC '95, PD2-9, 1995.
2) P. Nouchi et al., "Low-Loss single mode fiber with high nonlinear effective area", ThH2, OFC '95.
3) J. P. Hamaide et al., "Experimental 10 Gbit/s sliding filter guided soliton transmission up to 19 Mm with 63 km amplifier spacing using large effective area fiber management", Th.A. 3.7., ECOC '95.

Moreover, M. Suzuki et al. have conducted an experiment of wavelength division multiplexing optical amplifying and repeating transmission using an optical fiber having a large nonlinear effective cross-sectional area (large core fiber, LCF). This report is entitled "170 Gb/s Transmission over 10,850 km using large core transmission fiber", OFC' 98 PD17, 1998. Configuration of the optical transmission fiber used in this transmission experiment is shown FIG. 19 and its characteristics are shown in Table 1.

TABLE 1

Comparison of WDM Fiber With Large Core Fiber (LCF)-Typical Values

|  | WDM Fiber | LCF |
|---|---|---|
| Dispersion at 1550 nm (ps/nm/km) | −2.0 | −2.3 |
| Dispersion Slope at 1550 (ps/nm²/km) | 0.08 | 0.11 |
| Aeff ($\mu m^2$) | 53 | 80 |
| Loss (dB/km) | 0.20 | 0.22 |

In the first half of the repeating span, LCF is used and in the second half of the repeating span, conventional dispersion-shifted WDM fiber (WDMF) is used. LCF has an advantage in that the nonlinear effective cross-sectional area is large and disadvantages in that the transmission loss is large and the dispersion slope is also large. Meanwhile, WDMF has an advantage that transmission loss is small and dispersion slope is also small and a disadvantage in that the nonlinear effective cross-sectional area is small. This disadvantage can be compensated for by using LCF and WDM fiber in combination.

However, the essential disadvantage is that the transmission loss of LCF is large. Particularly, its transmission loss becomes large rapidly if an external force is applied to the optical fiber or such an optical fiber is bent. Thus, the optical fiber cable provided for installation has a higher probability of an increase in the transmission loss. Tsuchiya et al. have discussed the waveguide structure parameter of a uniform core optical fiber having the zero-dispersion wavelength of 1.5 $\mu$m. The report is entitled "Dispersion-free single-mode fiber in 1.5 $\mu$m wavelength region", Electronics Letters, vol. 15, No. 15, pp. 476–478, 1979. The relationship between relative core-cladding index difference and core radius to realize zero-dispersion is shown in FIG. 20. The sections a–b of the solid lines in the Figure indicate the optimum values and the dotted lines indicate the higher order mode cutoff condition. Here, there is a tendency that the longer the zero-dispersion wavelength is, the smaller the core system becomes and the larger the specific refractive index becomes. This results in a higher probability of an increase of the bending loss.

Therefore, it is a big issue in the wavelength division multiplexing optical amplifying and repeating transmission system that a low transmission loss and a nonlinear effective cross-sectional area must be realized simultaneously.

SUMMARY OF THE INVENTION

An object of the present invention is to provide an optical fiber transmission line for wavelength division multiplexing transmission system in which the above-mentioned disadvantages are eliminated.

The above object of the present invention is achieved by an optical transmission system for transmitting an optical signal through an optical fiber transmission line, the optical fiber transmission line comprising: a first optical fiber transmitting the optical signal and having a first zero-dispersion wavelength shorter than a wavelength of the optical signal; and a second optical fiber transmitting the optical signal from the first optical fiber and having a second zero-dispersion wavelength longer than the wavelength of the optical signal. A first nonlinear effective cross-sectional area of the first optical fiber is larger than a second nonlinear effective cross-sectional area of the second optical fiber.

The optical transmission system may be configured so that chromatic dispersion values and lengths of the first optical fiber and the second optical fiber are so selected that the total chromatic dispersion value of the first and second optical fibers becomes a negative value.

The optical transmission system may be configured so that the first nonlinear effective cross- sectional area of said first optical fiber is 70 $\mu m^2$ or more and the second nonlinear effective cross-sectional area of said second optical fiber is smaller than 70 $\mu^2$.

The optical transmission system may be configured so that the chromatic dispersion value of said first optical fiber is selected from +1 to +2 ps/nm/km, and the chromatic dispersion value of said second optical fiber is selected from −3 to −2 ps/nm/km.

The above object of the present invention is also achieved by an n optical transmission system for transmitting an optical signal through an optical fiber transmission line, the optical fiber transmission line comprising: a first optical fiber, transmitting the optical signal, and having a first zero-dispersion wavelength shorter than a wavelength of the optical signal and a first nonlinear effective cross-sectional area; a second optical fiber, transmitting the optical signal from the first optical fiber, and having a second dispersion wavelength longer than the wavelength of the optical signal and a second nonlinear effective cross-sectional area smaller than the first nonlinear effective cross-sectional area; and a third optical fiber, transmitting the optical signal from the second optical fiber, of which a third chromatic dispersion value and length is selected to cancel a total chromatic dispersion value of the first and second optical fibers.

The just above optical transmission system may be configured so that the chromatic dispersion values and lengths of the first optical fiber and the second optical fiber are so selected that the total chromatic dispersion value of the first and second optical fibers becomes a negative value.

BRIEF DESCRIPTION OF THE DRAWINGS

Other objects, features and advantages of the present invention will become more apparent from the following detailed description when read in conjunction with the accompanying drawings, in which:

FIG. 5 shows an example using a positive dispersion LCF as a dispersion compensation fiber;

FIG. 6 shows a diagram of an accumulated chromatic dispersion at each transmission distance;

FIG. 7 shows inversion of a structuring ratio of the positive dispersion LCF and negative dispersion WDMF as a dispersion compensation fiber;

FIG. 8 shows a diagram of an accumulated chromatic dispersion at each transmission distance;

FIG. 11 shows a wavelength division multiplexing transmission system based on the example of the chromatic dispersion design shown in FIG. 9;

FIG. 12 shows a diagram of an accumulated chromatic dispersion at each transmission distance;

FIG. 13 shows a diagram of an accumulated chromatic dispersion at each transmission distance;

FIG. 14 shows an example of a chromatic dispersion design using a pre-dispersion compensation fiber for the shortest wavelength;

FIG. 15 shows an example of a chromatic dispersion design using a pre-dispersion compensation fiber for the longest wavelength;

FIG. 16 shows an example of a chromatic dispersion design using a pre-dispersion compensation fiber;

DESCRIPTION OF THE PREFERRED EMBODIMENTS

1. Transmission Fiber

A transmission fiber which occupies a greater part of an optical fiber transmission line will now be explained.

Figure 1:
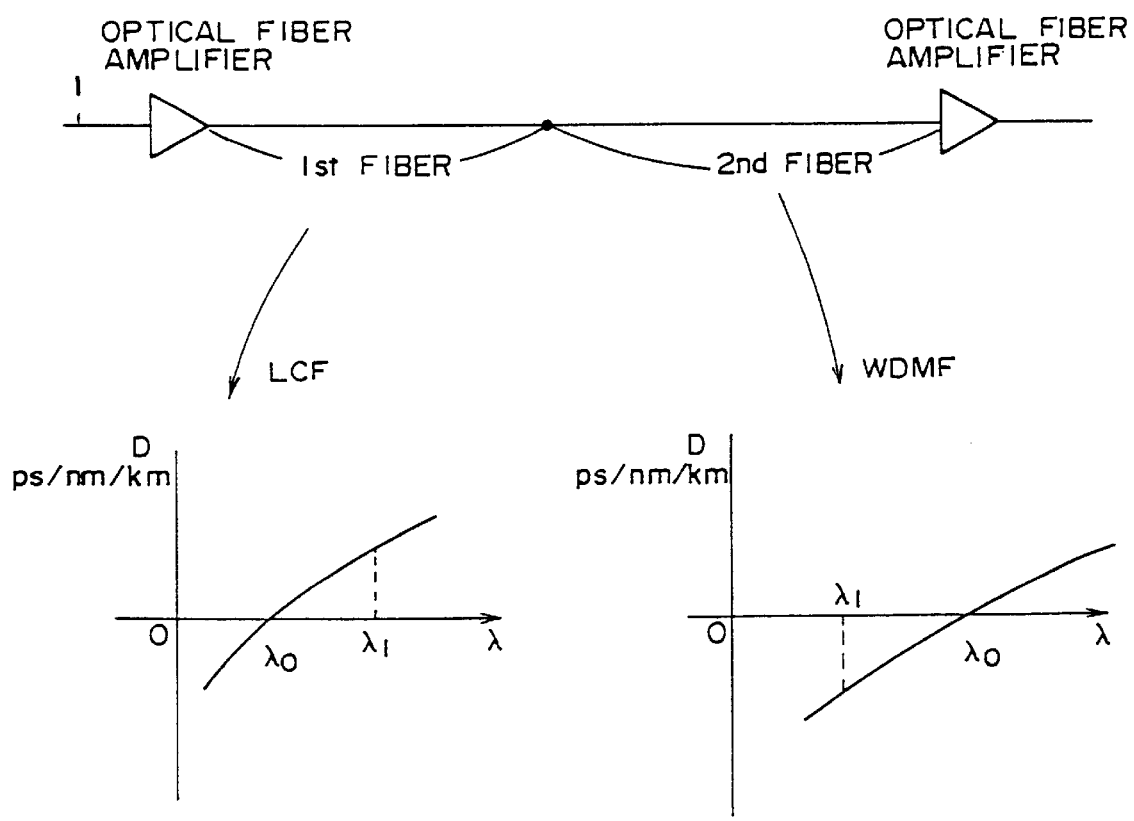
FIG. 1 shows a combination of two kinds of optical fibers employed as an optical fiber transmission line.

In a preferred embodiment, a combination of two kinds of optical fibers is employed as the optical fiber transmission line. Referring to FIG. 1, one optical fiber of the combination is a positive dispersion LCF in which the zero-dispersion wavelength $\lambda 0$ is shorter than the wavelength of an optical signal $\lambda 1$ and the nonlinear effective cross-sectional area is as large as about 80 $\mu m^2$.

The other optical fiber is a negative dispersion WDMF in which the zero-dispersion wavelength $\lambda 0$ is longer than the wavelength of the optical signal $\lambda 1$ and the nonlinear effective cross-sectional area is as small as about 50 $\mu^2$.

1) Absolute Value of Chromatic Dispersion

Figure 2A:
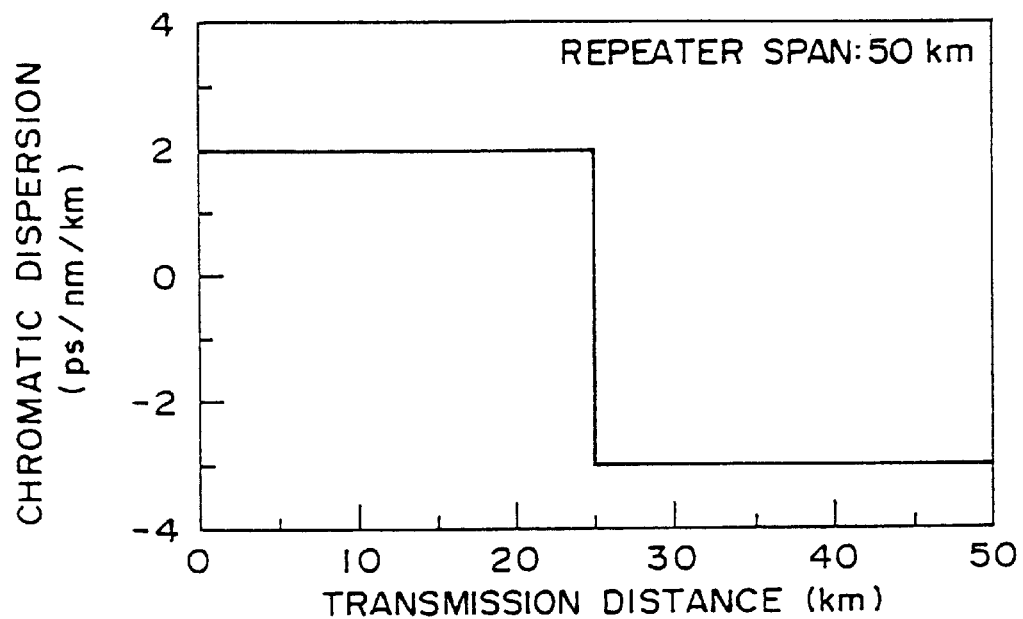
FIG. 2(a) shows a first embodiment of the present invention.
Figure 2B:
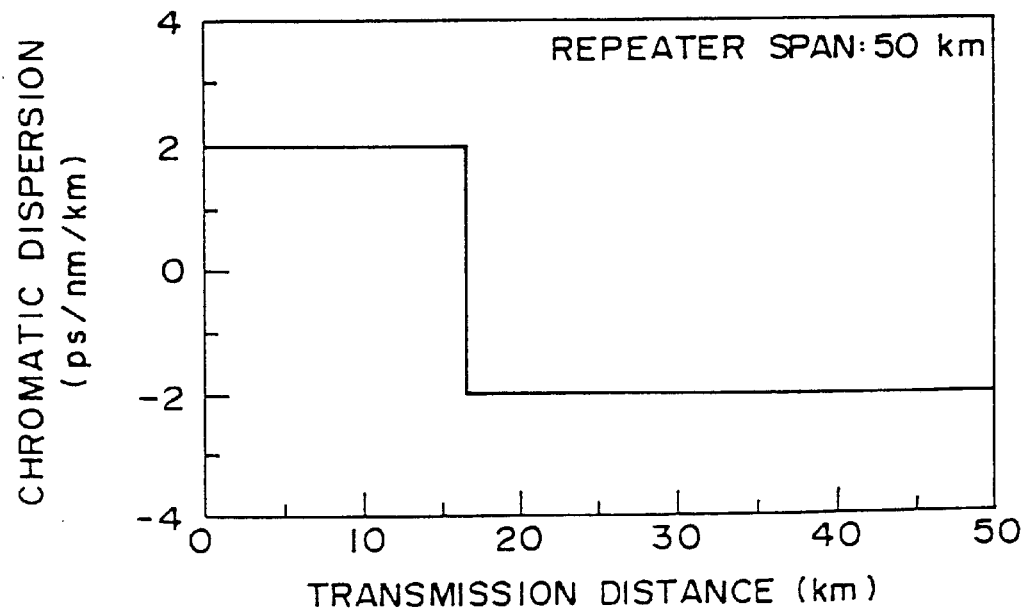
FIG. 2(b) shows a second embodiment of the present invention.

FIG. 2(*a*) shows a first embodiment of the present invention. The repeating span is 50 km. In the first half 25 km of the repeating span, the positive dispersion LCF is used and in the second half (25 km) of the repeating span, the negative dispersion WDMF is used. The average chromatic dispersion of the overall repeating span can be set to be negative by setting the absolute value of the chromatic dispersion of the negative dispersion WDMF to be larger than that of the positive dispersion LCF. The lengths of LCF and WDMF are equal. As a practical example, the chromatic dispersion of the positive dispersion LCF is 2 ps/nm/km, while the chromatic dispersion of the negative dispersion WDMF is –3 ps/nm/km.

In the optical communication system, an upward line and a downward line are generally included in a single optical fiber cable. In this case, the connecting point of two different kinds of optical fibers is located at almost the center of the repeating span.

2) Optical Fiber Length

FIG. 2(*b*) shows a second embodiment of the present invention. The repeating span is 50 km. In the first part of the repeating span (about ⅓ of the repeating span), the positive dispersion LCF is used and in the second part of the repeating span (about ⅔ of the repeating span), the negative dispersion WDMF is used. The average chromatic dispersion of the overall repeating span can be set to be negative by setting the optical fiber length of the negative dispersion WDMF to be longer than that of the positive dispersion LCF. The absolute value of the chromatic dispersion of both optical fibers is identical. In more practical, the optical fiber length of the positive dispersion LCF is 16.7 km and that of the negative dispersion WDMF is 33.3 km. In general, when the optical fiber length of the positive dispersion LCF is rather short, a reduction of the nonlinear effect of the optical fiber transmission line becomes smaller. In this case, when a transmission loss of LCF per length is assumed to be 0.22 dB/km, the transmission loss becomes 3.5 dB and an optical signal is input to the WDMF after its power is reduced to a half or less.

In the optical communication system, an upward line and a downward line are generally included in a single optical fiber cable. In this case, two connecting points of different kinds of fibers are located at about the ⅓ point and about the ⅔ point of the repeating span.

3) Absolute Value of Chromatic Dispersion and Optical Fiber Length

Figure 3:
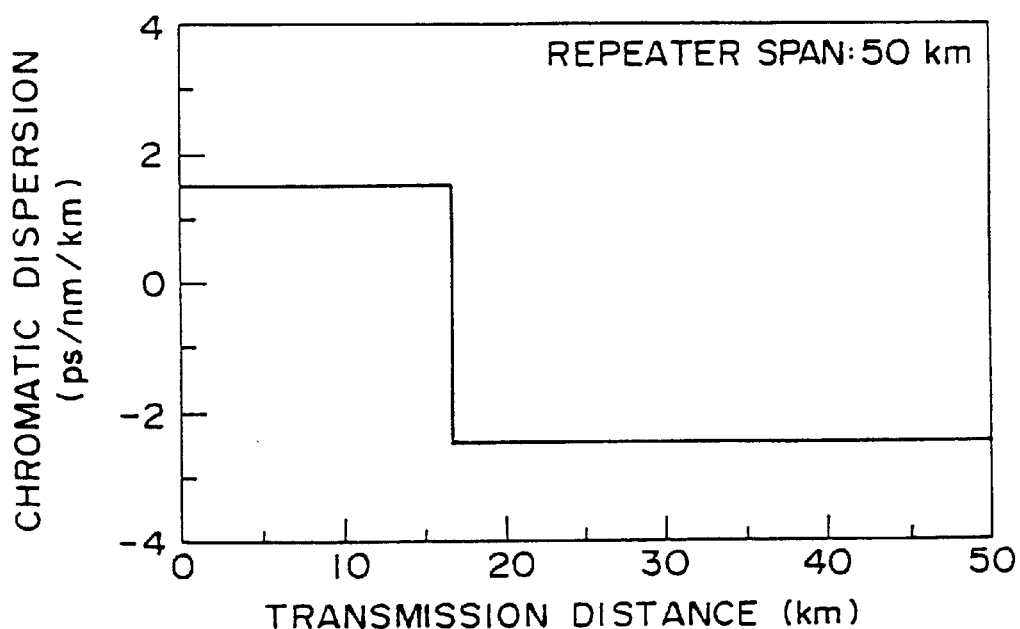
FIG. 3 shows a third embodiment of the present invention.

FIG. 3 shows a third embodiment of the present invention. The repeating span is 50 km. In the first part of the repeating span (about ⅓ of the repeating span), the positive dispersion LCF is used and in the second part (about ⅔ of the repeating span), the negative dispersion WDMF is used. The average chromatic dispersion of the overall repeating span can be set to be a negative value by setting the optical fiber length of the negative dispersion WDMF to be longer than the positive dispersion LCF and then by setting the absolute value of chromatic dispersion of the negative dispersion WDMF to be larger than that of the positive dispersion LCF. The third embodiment shown in FIG. 3 relates to a combination of the first embodiment in FIG. 2(*a*) and the second embodiment in FIG. 2(*b*).

Figure 4:
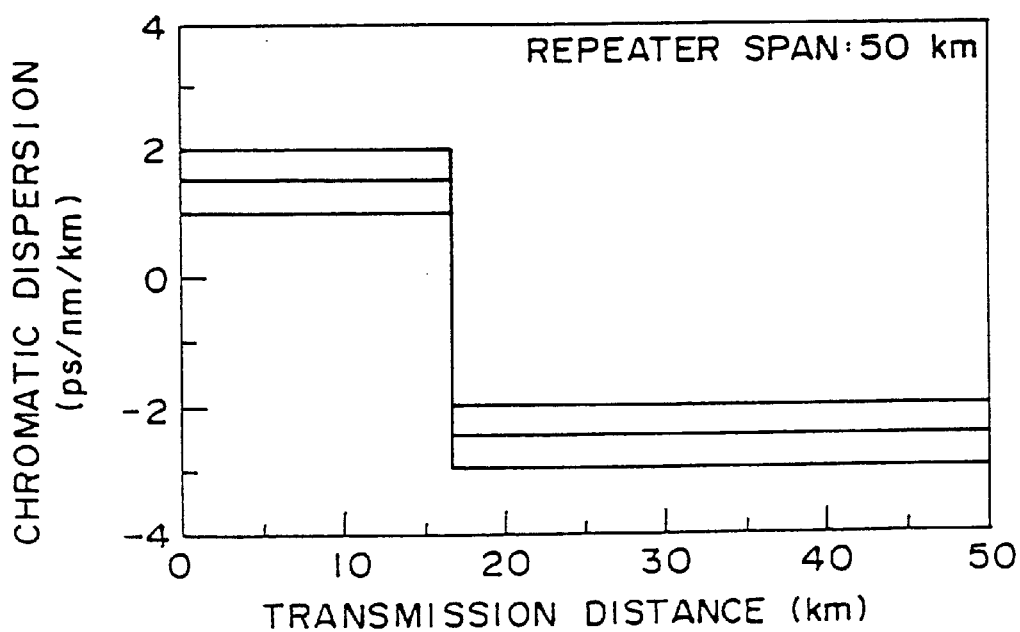
FIG. 4 shows a diagram of a chromatic dispersion at each transmission distance in connection with a wavelength division multiplexing optical signal.

FIG. 4 shows a wavelength division multiplexing optical signal used in the third embodiment shown in FIG. 3. The repeating span is 50 km. While FIG. 1 to FIG. 3 each show a diagram of the chromatic dispersion at each transmission distance in connection with the optical signal of a single wavelength, FIG. 4 shows a diagram of the chromatic dispersion at each transmission distance in connection with the wavelength division multiplexing optical signal. In particular, FIG. 4 shows the diagram of the chromatic dispersion regarding three optical signals of different wavelengths, i.e., a shortest wavelength, an intermediate wavelength and a longest wavelength, of the wavelength division multiplexing optical signal. The chromatic dispersion of the positive dispersion LCF ranges from +1 to +2 ps/nm/km, while the chromatic dispersion of the negative dispersion WDMF ranges between –2 and –3 ps/nm/km. The zero-dispersion wavelength does not match with the optical signal wavelength and the absolute value of the chromatic dispersion is set to 1 ps/nm/km or more in both positive dispersion LCF and the negative dispersion WDMF. When the absolute value of these chromatic dispersions is around 0 ps/nm/km, the group velocities between the optical signals and spontaneous emission generated from optical amplifiers and among optical signals become identical and the period in which the nonlinear effect mutually affects these optical signals and the spontaneous emission becomes longer. Therefore, it is possible to cause deterioration of the transmission characteristics due to FWM and XPM.

2. In-line Dispersion Compensation Fiber

A dispersion compensation fiber inserted into the optical fiber transmission line is called an in-line dispersion compensation fiber. Various dispersion compensation fibers will now be explained.

1) Only Positive Dispersion LCF

FIG. 5 shows an example using the positive dispersion LCF as the dispersion compensation fiber. The repeating span is 50 km and the chromatic dispersion compensating span is 500 km. The chromatic dispersion of the positive dispersion LCF is +2 ps/nm/km and the chromatic dispersion of the negative dispersion WDMF is –3 ps/nm/km. In each repeating span from the first repeating span to the eighth repeating span (0 to 400 km in the Figure), the positive dispersion LCF is used for the first half 25 km of the repeating span and the negative dispersion WDMF for the second half 25 km of the repeating span. Moreover, for each repating span from the ninth repeating span to the tenth repeating span (400 to 500 km in the Figure), the positive dispersion LCF is used for the overall distance of 50 km of the repeating span.

FIG. 6 shows a diagram of the accumulated chromatic dispersion at each transmission distance. Just in the 500 km point, the accumulated chromatic dispersion becomes zero.

2) Inversion of Structuring Ratio of the Positive Dispersion LCF and Negative Dispersion WDMF FIG. 7 shows inversion of structuring ratio of the positive dispersion LCF and the negative dispersion WDMF as the dispersion compensation fiber. The repeating span is 50 km and the chromatic dispersion compensating span is 500 km. The chromatic dispersion of the positive dispersion LCF is +2 ps/nm/km and chromatic dispersion of the negative dispersion WDMF is −2 ps/nm/km. In each repeating span from the first repeating span to the fifth repeating span (0 to 250 km in the Figure), the positive dispersion LCF is used in the first part of the repeating span (about ⅓ of the repeating span) and the negative dispersion WDMF is used in the second part of the repeating span (about ⅔ of the repeating span). Further, in each repeating span from the sixth repeating span to the tenth repeating span (250 to 500 km in the Figure), the positive dispersion LCF is used in the first part of the repeating span (about ⅔ of the repeating span) and the negative dispersion WDMF is used in the second part of the repeating span (about ⅓ of the repeating span).

FIG. 8 shows a diagram of the accumulated chromatic dispersion at each transmission distance. Just at the 500 km point, the accumulated chromatic dispersion becomes zero.

3) 1.3 μ zero-dispersion fiber

Figure 9:
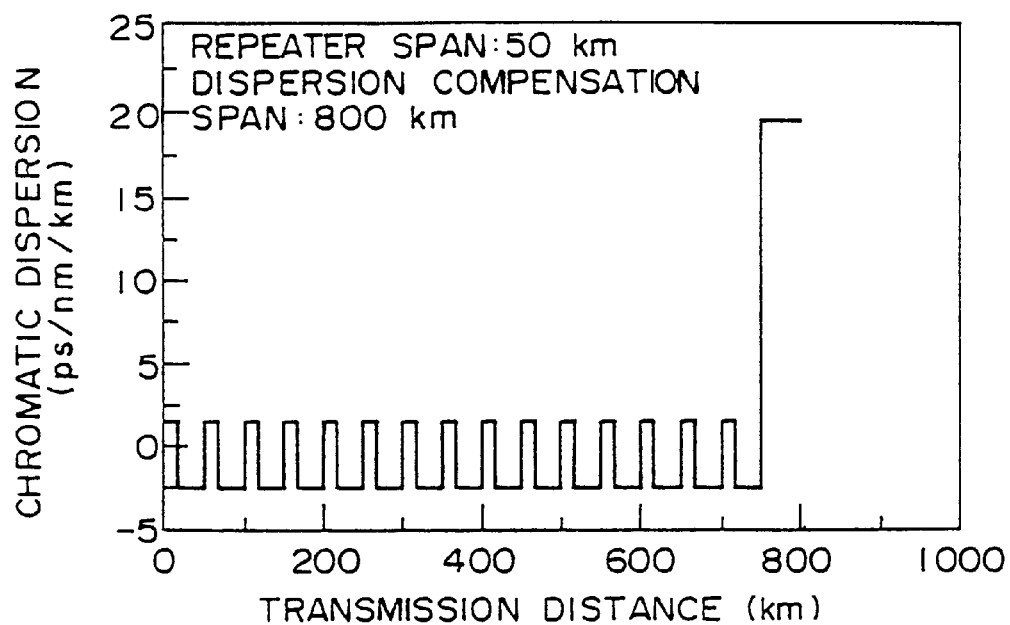
FIG. 9 shows an example where a 1.3 $\mu$m zero-dispersion fiber is used as a dispersion compensation fiber.
Figure 10:
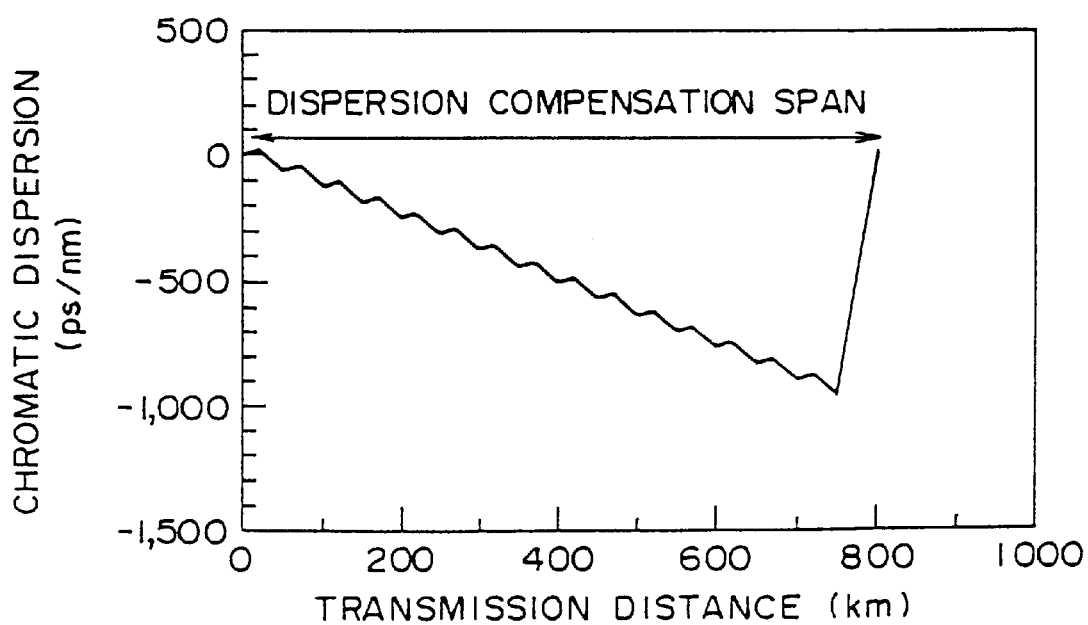
FIG. 10 shows a diagram of an accumulated chromatic dispersion at each transmission distance.
Figure 17A:
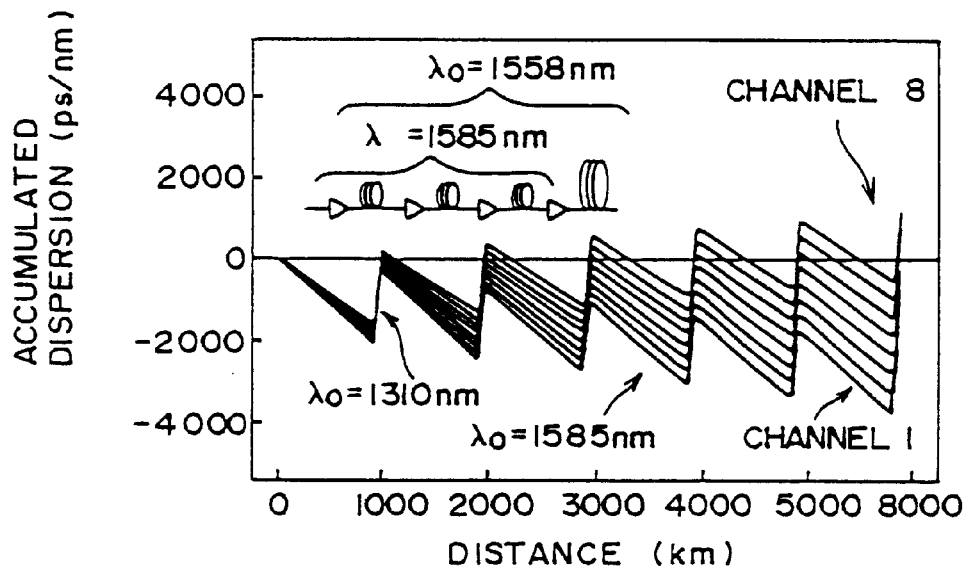
FIGS. 17(a) and 17(b) show an example of chromatic dispersion in an experimental transmission system.
Figure 17B:
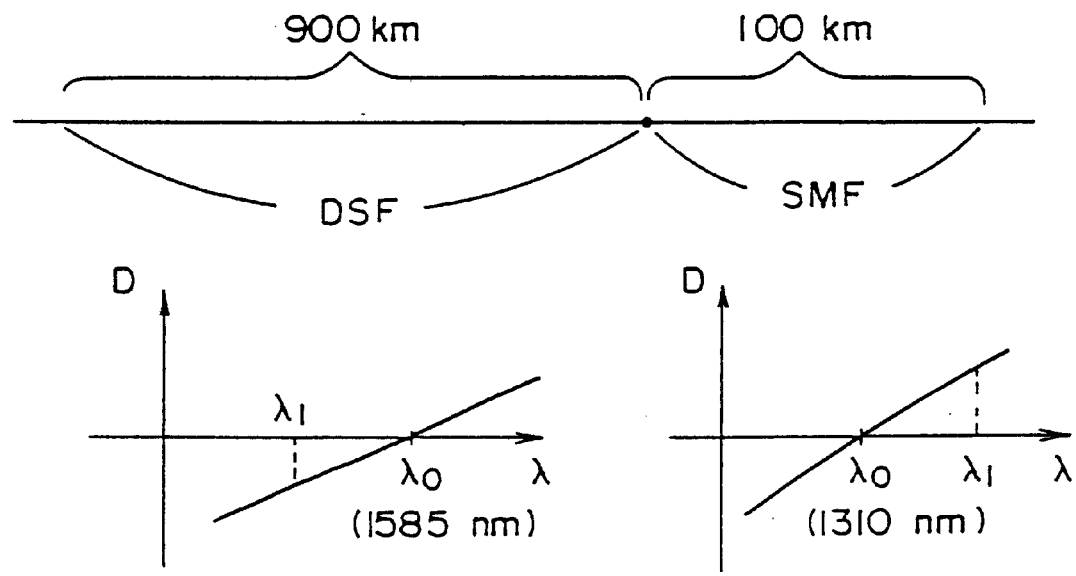
Figure 18:
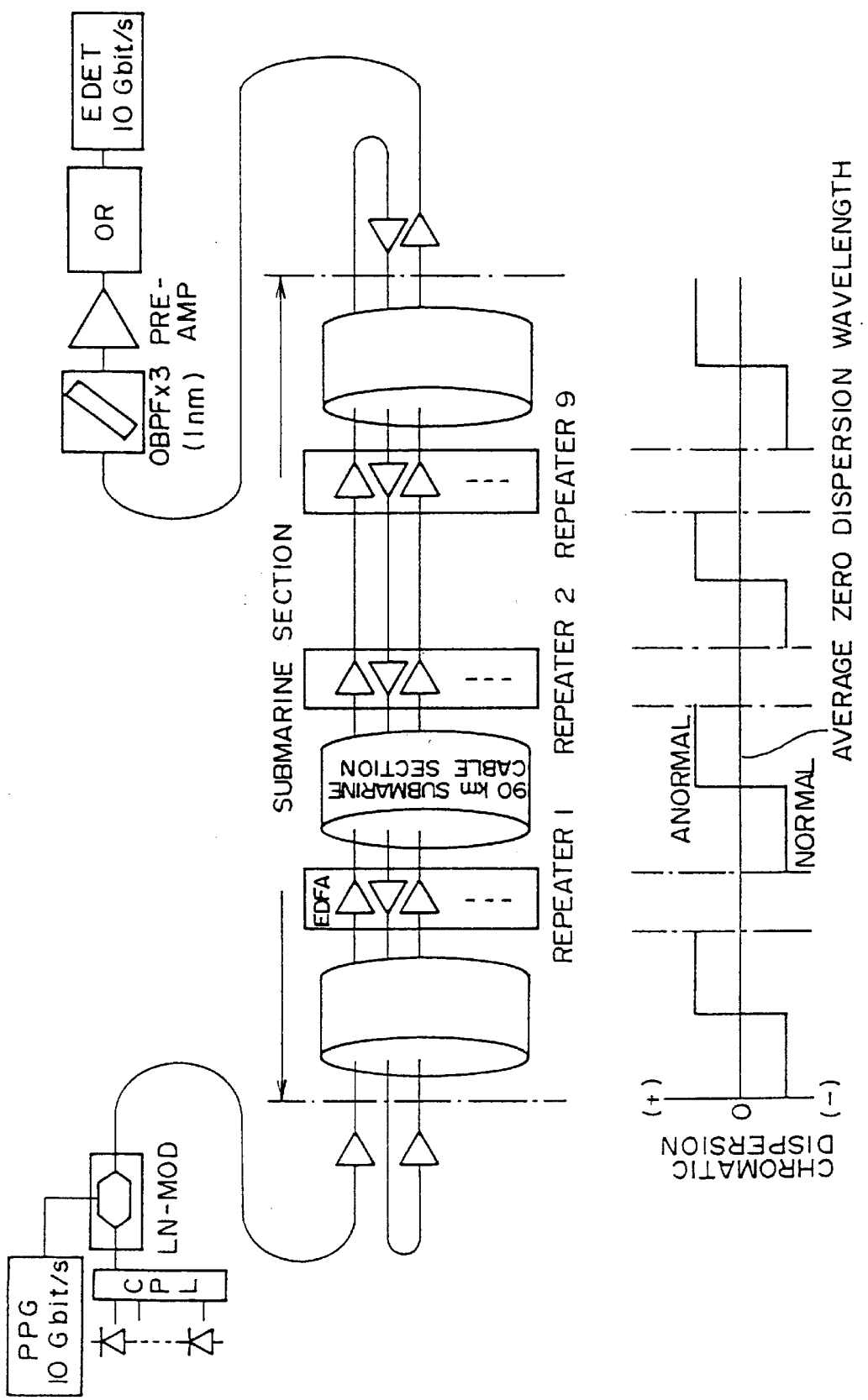
FIG. 18 shows a proposed method to manage the chromatic dispersion of an optical fiber transmission line.
Figure 19:
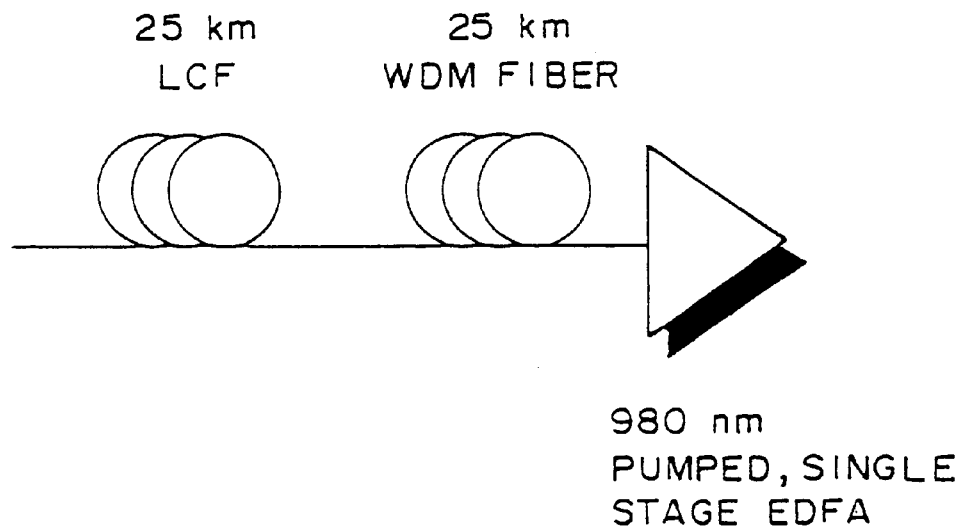
FIG. 19 shows a configuration of a single span.
Figure 20:
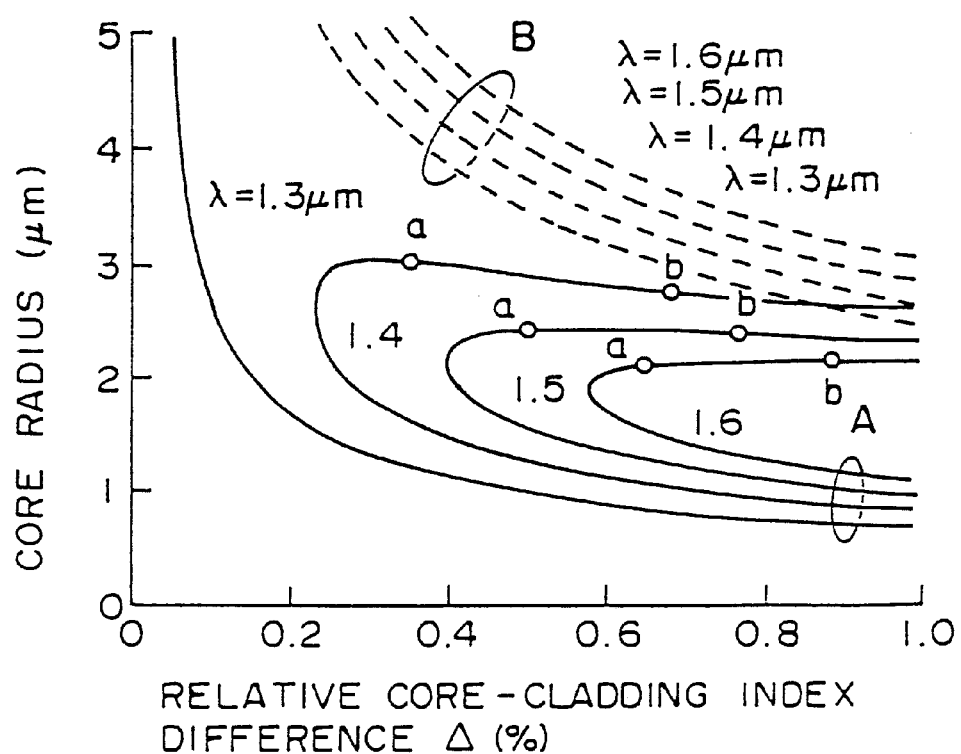
FIG. 20 shows a relationship between a relative core-cladding index difference and core radius to realize the zero dispersion.

FIG. 9 shows an example where a 1.3-μm zero-dispersion fiber is used as the dispersion compensation fiber. The repeating span is 50 km and the chromatic dispersion compensating span is 800 km. The chromatic dispersion of the positive dispersion LCF is +1.5 ps/nm/km and the chromatic dispersion of the negative dispersion WDMF is −2.5 ps/nm/km. In each repeating span from the first repeating span to the fifteenth repeating span (0 to 750 km in the Figure), the positive-dispersion LCF is used in the first part of the repeating span (about ⅓ of the repeating span) and the negative dispersion WDMF is used the second half of the repating span (about ⅔ of the repeating span). Moreover, in the sixteenth repeating span (750 to 800 km in the Figure), only the 1.3 μm zero-dispersion fiber is used. FIG. 10 shows 21 diagram of the accumulated chromatic dispersion at each transmission distance. Just at the 800 km point, the accumulated chromatic dispersion becomes zero.

3. Pre-dispersion Compensation Fiber

In the Wavelength Division Multiplexing transmission system, optical signals having slightly different wavelengths have different chromatic dispersions, respectively, depending on the chromatic dispersion slope of the optical fiber transmission line.

Therefore, in the chromatic dispersion design of the optical fiber transmission line in the wavelength division multiplexing transmission system, it is desirable to discuss the optical signals of the three wavelengths, i.e., the shortest wavelength, the intermediate wavelength and the longest wavelength.

For example, FIG. 11 shows the wavelength division multiplexing transmission system based on the example of the chromatic dispersion design shown in FIG. 9. Here, the wavelength bandwidth of the optical signal is 12 nm, the shortest wavelength is shorter by 6 nm than the intermediate wavelength and the longest wavelength is longer by 6 nm than the intermediate wavelength. The chromatic dispersion slope of the optical fiber transmission line is about 0.1 ps/nm²/km.

Chromatic dispersion of the positive dispersion LCF for the intermediate wavelength is +1.5 ps/nm/km and chromatic dispersion of the negative dispersion WDMF is −2.5 ps/nm/km. Chromatic dispersion LCF for the shortest wavelength is +0.9 ps/nm/km and chromatic dispersion of the negative dispersion WDMF is +2.1 ps/nm/km and the chromatic dispersion of the negative dispersion WDMF is −1.9 ps/nm/km.

FIG. 12 shows a diagram of the accumulated chromatic dispersion at each transmission distance. Just al. the 800 km point, the accumulated chromatic dispersion for the intermediate wavelength becomes zero. However, the accumulated chromatic dispersion for the shortest wavelength is about −500 ps/nm and the accumulated chromatic dispersion for the longest wavelength is about +500 ps/nm.

FIG. 13 shows a diagram of the accumulated chromatic dispersion at each transmission distance. The chromatic dispersion compensating span is about 800 km and the transmission distance is 6,400 km. Here, attention is paid to the amount of the accumulated chromatic dispersion after transmission of about 6,400 km. In the case of the intermediate wavelength, the accumulated chromatic dispersion becomes zero. However, in the case of the shortest wavelength, the accumulated chromatic dispersion is about −4000 ps/nm and in the case of the longest wavelength, the accumulated chromatic dispersion is about +4000 ps/nm.

When the absolute value of the accumulated chromatic dispersion after the transmission is large, a pre-dispersion compensation fiber is used in the transmitting side to conduct chromatic dispersion compensation.

FIG. 14 shows an example of the chromatic dispersion design using the pre-dispersion compensation fiber for the shortest wavelength. In the transmitting side, the pre-compensation fiber of about +2000 ps/nm/km for compensating for about a half of the accumulated dispersion of about −4000 ps/nm is used.

FIG. 15 shows an example of the chromatic dispersion design using the pre-dispersion compensation fiber for the longest wavelength. In the transmitting side, the pre-compensation fiber of about -2000 ps/nm/km for compensating about a half of the accumulated dispersion of about +4000 ps/nm is used.

FIG. 16 shows an example of the chromatic dispersion design using the pre-dispersion compensation fiber. In comparison with FIG. 13, fluctuation of accumulated chromatic dispersion after the transmission can be controlled so as to be independent of the wavelength of the optical signal to a large extent and thereby good transmission characteristics can be expected.

According to the foregoing embodiments, an optical fiber transmission line, which simultaneously satisfies the following major requirements for the optical fiber transmission line used in the wavelength division multiplexing transmission system, can be realized, and such a system achieves good transmission characteristic to enable a large capacity, long-haul wavelength division multiplexing transmission system.

(1) low transmission loss
(2) large nonlinear effective cross-sectional area
(3) Nomatching between a wavelength of an optical signal and a zero-dispersion wavelength
(4) average chromatic dispersion in a direction of transmission distance is negative
(5) chromatic dispersion compensation interval is about 10 times the repeating interval The present invention is not limited to the specifically disclosed embodiments, and variations and modifications may be made without departing from the scope of the present invention.

What is claimed is:

1. An optical transmission system to transmit an optical signal through an optical fiber transmission line, the optical fiber transmission line comprising:

a first optical fiber transmitting the optical signal and having a first zero-dispersion wavelength shorter than a wavelength of the optical signal; and a second optical fiber transmitting the optical signal from the first optical fiber and having a second zero-dispersion wavelength longer than the wavelength of the optical signal, a first nonlinear effective cross-sectional area of the first optical fiber being larger than a second nonlinear effective cross-sectional area of the second optical fiber, wherein chromatic dispersion values and lengths of the first optical fiber and the second optical fiber are so selected that the total chromatic dispersion value of the first and second optical fibers becomes a negative value.

2. An optical transmission system to transmit an optical signal through an optical fiber transmission line, the optical fiber transmission line comprising:

a first optical fiber transmitting the optical signal and having a first zero-dispersion wavelength shorter than a wavelength of the optical signal; and a second optical fiber transmitting the optical signal from the first optical fiber and having a second zero-dispersion wavelength longer than the wavelength of the optical signal, a first nonlinear effective cross-sectional area of the first optical fiber being larger than a second nonlinear effective cross-sectional area of the second optical fiber, wherein the first nonlinear effective cross-sectional area of said first optical fiber is 70 $\mu m^2$ or more and the second nonlinear effective cross-sectional area of said second optical fiber is smaller than 70 $\mu m^2$.

3. The optical transmission system according to claim 1, wherein the chromatic dispersion value of said first optical fiber is selected from +1 to +2ps/nm/km, and the chromatic dispersion value of said second-optical fiber is selected from −3 to −2 ps/nm/km.

4. An optical transmission system for transmitting an optical signal through an optical fiber transmission line, the optical fiber transmission line comprising:

a first optical fiber, transmitting the optical signal, and having a first zero-dispersion wavelength shorter than a wavelength of the optical signal and a first nonlinear effective cross-sectional area;

a second optical fiber, transmitting the optical signal from the first optical fiber, and having a second zero-dispersion wavelength longer than the wavelength of the optical signal and a second nonlinear effective cross-sectional area smaller than the first nonlinear effective cross-sectional area; and a third optical fiber, transmitting the optical signal from the second optical fiber, of which a third chromatic dispersion value and length is selected to cancel a total chromatic dispersion value of the first and second optical fibers.

5. The optical transmission system according to claim 4, wherein the chromatic dispersion values and lengths of the first optical fiber and the second optical fiber are so selected that the total chromatic dispersion value of the first and second optical fibers becomes a negative value.

* * * * *

UNITED STATES PATENT AND TRADEMARK OFFICE
CERTIFICATE OF CORRECTION

PATENT NO.    : 6,480,658 B1
DATED         : November 12, 2002
INVENTOR(S)   : Takao Naito et al.

It is certified that error appears in the above-identified patent and that said Letters Patent is hereby corrected as shown below:

<u>Title page,</u>
Item [22], PCT Filed:, change "Feb. 8, 1999" to -- Feb. 18, 1999 --.

Signed and Sealed this

Twelfth Day of August, 2003

JAMES E. ROGAN
*Director of the United States Patent and Trademark Office*